United States Patent
Witt (10) Patent No.: US 6,332,191 B1
(45) Date of Patent: Dec. 18, 2001

(54) SYSTEM FOR CANCELING SPECULATIVELY FETCHED INSTRUCTIONS FOLLOWING A BRANCH MIS-PREDICTION IN A MICROPROCESSOR

(75) Inventor: David B. Witt, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/233,259

(22) Filed: Jan. 19, 1999

(51) Int. Cl.$^7$ ........................................................ G06F 9/32

(52) U.S. Cl. ........................................... 712/240; 712/237

(58) Field of Search .............................. 712/240, 23, 200, 712/214, 215, 216, 210, 204, 213, 230, 231, 237, 238, 239

(56) References Cited

U.S. PATENT DOCUMENTS

| | | |
|---|---|---|
| 5,142,634 | 8/1992 | Fite et al. . |
| 5,283,873 | * 2/1994 | Steely, Jr. et al. ................... 712/240 |
| 5,434,985 | * 7/1995 | Emma et al. ........................ 712/240 |
| 5,608,886 | * 3/1997 | Blomgren et al. ................... 712/239 |

(List continued on next page.)

OTHER PUBLICATIONS

Calder et al., "Next Cache Line and Set Prediction," Computer Architecture News, No. 2, May 23, 1995, pp. 287–296.
Johnson, *Superscalar Microprocessor Design*, P T R Prentice–Hall, Inc. 1991, pp. 71–75.
Dutta, S. et al., Block–level prediction for wide–issue superscalar processors, IEEE First international Conference on Algorithms and Architectures for Parallel Processing, IEEE, Apr. 19–21, 1995.*
Wallace, S. et al., Multiple branch and block prediction, Third International Symposium on High–Performance Computer Architecture, IEEE, Feb. 1–5, 1997.*

*Primary Examiner*—Richard L. Ellis
(74) *Attorney, Agent, or Firm*—Conley, Rose & Tayon, PC; Lawrence J. Merkel (57) ABSTRACT

A line predictor is configured to speculatively fetch instructions following a branch instruction. The line predictor stores a plurality of lines that each contain instruction line information. Each line stored by the line predictor includes a fetch address, information regarding one or more instructions, and one or more next fetch addresses. In response to receiving a fetch address, the line predictor is configured to provide instruction line information corresponding to the one or more instructions located at the fetch address to an alignment unit. The line predictor is also configured to provide a next fetch address associated with the fetch address to an instruction cache for speculative fetching and to a branch prediction unit for a branch prediction. The next fetch address is further fed back into the line predictor to generate the instruction line information associated with it and a subsequent next fetch address. A next fetch address may be the sequential address following the last instruction associated with the instruction line information of the fetch address. If an instruction within the instruction line information of the fetch address is a branch instruction, however, the next fetch address may be the target address of the branch instruction. The branch prediction unit is configured to generate a branch prediction in response to receiving a next fetch address if a branch instruction is detected in the instruction line information of the next fetch address. The branch prediction is then compared to a subsequent next fetch address. If the branch prediction differs from a subsequent next fetch address, operations that were initiated using the subsequent next fetch address are canceled, the subsequent next fetch address is updated in the line predictor, and the updated subsequent next fetch address is refetched.

17 Claims, 6 Drawing Sheets

| 0 | 1 | 2 |
|---|---|---|
| Address A is generated in the line predictor and provided to I-cache branch prediction unit and line predictor | Address A's instruction fetched in I-cache<br><br>Branch Prediction Generated in Branch Prediction Unit Using Address A<br><br>Address B is Generated in Line Predictor Using Address A | Address B is compared with the Branch Prediction<br><br>If Address B differs from the Branch Prediction, Address B operations are cancelled, the line predictor is updated using the branch prediction, and an address corresponding to the branch prediction is fetched |

U.S. PATENT DOCUMENTS

| | | | |
|---|---|---|---|
| 5,742,805 | * | 4/1998 | Kulkarni et al. ............... 712/239 |
| 5,758,143 | | 5/1998 | Levitan . |
| 5,794,028 | | 8/1998 | Tran . |
| 5,805,878 | * | 9/1998 | Rahman et al. ............... 712/239 |
| 5,828,874 | * | 10/1998 | Steely, Jr. et al. ............ 712/240 |
| 5,848,433 | | 12/1998 | Tran et al. . |
| 6,092,187 | * | 7/2000 | Killian ......................... 712/239 |
| 6,119,222 | * | 9/2000 | Shiell et al. .................. 712/238 |
| 6,122,727 | * | 9/2000 | Witt ............................ 712/214 |
| 6,125,441 | * | 9/2000 | Green ......................... 712/210 |
| 6,185,675 | * | 2/2001 | Kranich et al. ............... 712/238 |

* cited by examiner

SYSTEM FOR CANCELING SPECULATIVELY FETCHED INSTRUCTIONS FOLLOWING A BRANCH MIS-PREDICTION IN A MICROPROCESSOR

BACKGROUND OF THE INVENTION

1. Field of the Invention

This invention is related to the field of processors and, more particularly, to speculatively fetching instructions following a branch instruction in a microprocessor.

2. Description of the Related Art

Superscalar processors attempt to achieve high performance by issuing and executing multiple instructions per clock cycle and by employing the highest possible clock frequency consistent with the design. Over time, the number of instructions concurrently issuable and/or executable by superscalar processors has been increasing in order to increase the performance of superscalar processors.

Unfortunately, many of the concurrently issuable and/or executable instructions are branch instructions where the address of the instruction subsequent to the branch instruction may not be known prior to execution of the branch instruction. Consequently, branch instructions may incorporate significant delays into a superscalar microprocessor.

One mechanism to counter the delays caused by branch instructions is a branch prediction unit. A branch prediction unit is typically configured to provide a branch prediction address in response to receiving the address of a branch instruction. In order to generate a branch prediction address, however, a branch instruction typically must be fetched and decoded. After a branch instruction is fetched and decoded, a branch prediction unit must then spend one or more clock cycles generating a branch prediction address. Although a branch prediction unit reduces the delay associated with branch instructions, significant delays still occur between fetching a branch instruction and generating a corresponding branch prediction address. It would be desirable to minimize the time between fetching a branch instruction and generating a branch prediction address.

SUMMARY OF THE INVENTION

The problems outlined above are in large part solved by a line predictor configured to speculatively fetch instructions following a branch instruction. The line predictor stores a plurality of lines that each contain instruction line information. Each line stored by the line predictor includes a fetch address, information regarding one or more instructions, and one or more next fetch addresses. In response to receiving a fetch address, the line predictor is configured to provide instruction line information corresponding to the one or more instructions located at the fetch address to an alignment unit. The line predictor is also configured to provide a next fetch address associated with the fetch address to an instruction cache for speculative fetching and to a branch prediction unit for a branch prediction. The next fetch address is further fed back into the line predictor to generate the instruction line information associated with it and a subsequent next fetch address.

Generally speaking, a next fetch address may be a next sequential fetch address or a branch target address. A next sequential fetch address is the sequential address following the last instruction associated with the instruction line information of the fetch address unless an instruction within the line is a branch instruction. If an instruction within the instruction line information of the fetch address is a branch instruction, the next fetch address may be the target address of the branch instruction.

The branch prediction unit is configured to generate a branch prediction in response to receiving a next fetch address if a branch instruction is detected in the instruction line information of the next fetch address. The branch prediction is then compared to a subsequent next fetch address. If the branch prediction differs from a subsequent next fetch address, operations that were initiated using the next fetch address are canceled, the subsequent next fetch address is updated in the line predictor, and the updated subsequent next fetch address is refetched. In one particular embodiment, the line predictor contains multiple banks that each contain a plurality of lines for storing instruction line information. In this embodiment, the line predictor can be dual ported to update and refetch the subsequent next fetch address in the same clock cycle.

Broadly speaking, a microprocessor comprising a line predictor, an instruction cache, and a branch prediction unit is contemplated. The line predictor is configured to store instruction line information regarding two or more instructions terminated by a branch instruction. The line predictor is further configured to store a first fetch address corresponding to the two or more instructions and a second fetch address corresponding to the branch instruction. The instruction cache is coupled to the line predictor and configured to store a plurality of instructions. The branch prediction unit is coupled to the line predictor and is configured to store a plurality of branch predictions. The line predictor is also configured to provide the first fetch address to the instruction cache and the branch prediction unit during a first clock cycle.

A method for speculatively fetching one or more instructions following a branch instruction is also contemplated. A first fetch address is generated in a line predictor corresponding to a line of instruction line information regarding two or more instructions terminated by a branch instruction during a first clock cycle. A second fetch address is also generated in a line predictor corresponding to a predicted address of the branch instruction during a second clock cycle. The first fetch address is provided to a branch prediction unit during the first clock cycle where a branch prediction is generated for the branch instruction based on the first fetch address.

A microprocessor is also contemplated comprising a line predictor, an instruction cache, and a branch prediction unit. The line predictor includes a first and a second line of instruction line information. Each line of instruction line information includes a fetch address field configured to store a fetch address, a plurality of instruction/ROP fields, and a next fetch address field configured to store a next fetch address. The instruction cache is coupled to the line predictor and is configured to store a plurality of instructions. The branch prediction unit is coupled to the line predictor and is configured to store a plurality of branch predictions. A last of the plurality of instruction fields in the second line corresponds to a branch instruction and the second next fetch address corresponds to an instruction subsequent to the branch instruction. Also, the line predictor is configured to provide the first next fetch address to the instruction cache and the branch prediction unit during a first clock cycle.

A computer system comprising a microprocessor and an input/output device coupled to the microprocessor is also contemplated. The microprocessor comprises a line predictor, an instruction cache, and a branch prediction unit. The line predictor is configured to store instruction line information regarding two or more instructions terminated by a branch instruction. The line predictor is further configured to store a first fetch address corresponding to the two or more instructions and a second fetch address corresponding to the branch instruction. The instruction cache is coupled to the line predictor and configured to store a plurality of instructions. The branch prediction unit is coupled to the line predictor and is configured to store a plurality of branch predictions. The line predictor is configured to provide the first fetch address to the instruction cache and the branch prediction unit during a first clock cycle. The input/output device is configured to communicate between the computer system and another computer system coupled to the input/output device.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 1:
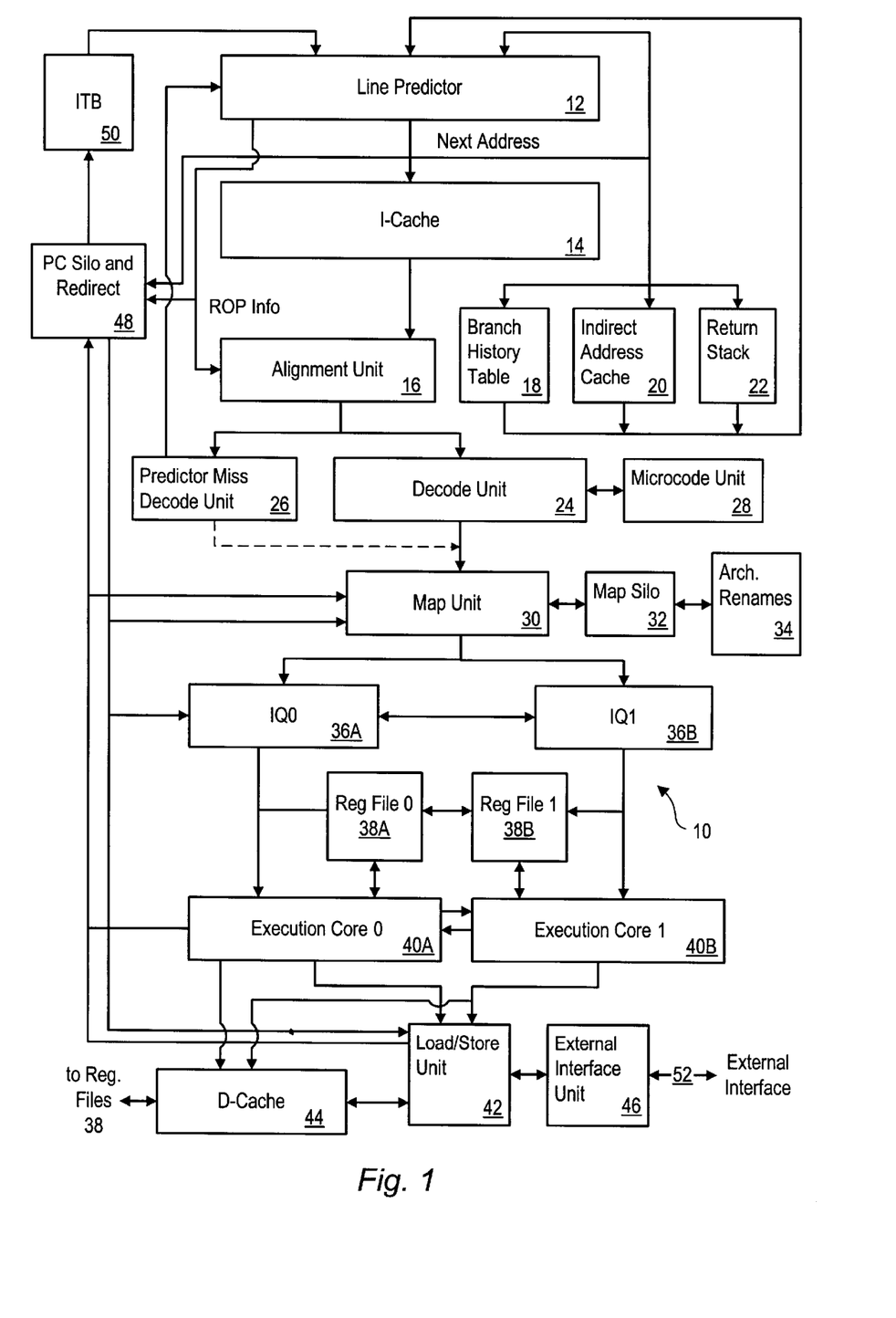
FIG. 1 is a block diagram of one embodiment of a processor.

Turning now to FIG. 1, a block diagram of one embodiment of a processor 10 is shown. Other embodiments are possible and contemplated. In the embodiment of FIG. 1, processor 10 includes a line predictor 12, an instruction cache (I-cache) 14, an alignment unit 16, a branch history table 18, an indirect address cache 20, a return stack 22, a decode unit 24, a predictor miss decode unit 26, a microcode unit 28, a map unit 30, a map silo 32, an architectural renames block 34, a pair of instruction queues 36A–36B, a pair of register files 38A–38B, a pair of execution cores 40A–40B, a load/store unit 42, a data cache (D-cache) 44, an external interface unit 46, a PC silo and redirect unit 48, and an instruction TLB (ITB) 50. Line predictor 12 is coupled to ITB 50, predictor miss decode unit 26, branch history table 18, indirect address cache 20, return stack 22, PC silo and redirect block 48, alignment unit 16, and I-cache 14. I-cache 14 is coupled to alignment unit 16. Alignment unit 16 is further coupled to predictor miss decode unit 26 and decode unit 24. Decode unit 24 is further coupled to microcode unit 28 and map unit 30. Map unit 30 is coupled to map silo 32, architectural renames block 34, instruction queues 36A–36B, load/store unit 42, execution cores 40A–40B, and PC silo and redirect block 48. Instruction queues 36A–36B are coupled to each other and to respective execution cores 40A–40B and register files 38A–318B. Register files 38A–38B are coupled to each other and respective execution cores 40A–40B. Execution cores 40A–40B are further coupled to load/store unit 42, data cache 44, and PC silo and redirect unit 48. Load/store unit 42 is coupled to PC silo and redirect unit 48, D-cache 44, and external interface unit 46. D-cache 44 is coupled to register files 38, and external interface unit 46 is coupled to an external interface 52. Elements referred to herein by a reference numeral followed by a letter will be collectively referred to by the reference numeral alone. For example, instruction queues 36A–36B will be collectively referred to as instruction queues 36.

Generally speaking, line predictor 12 is configured to generate a next fetch address corresponding to the first instruction in a subsequent line of instruction operations. Line predictor 12 then provides the next fetch address to I-cache 14, to branch prediction unit 60 (see FIG. 2), and back into itself. Line predictor 12 uses the next fetch address to generate a subsequent next fetch address. In one embodiment, line predictor 12 is configured to select a subsequent next fetch address from either a next sequential address or a target address using a next address selector field. In another embodiment, line predictor 12 is configured to select a stored subsequent next fetch address. If the line of instruction operations corresponding to the next fetch address terminates in a branch instruction, branch prediction unit 60 uses the next fetch address to generate a branch prediction. Branch prediction unit 60 then uses the branch prediction to determine if line predictor 12 selected the most updated subsequent next fetch address. If branch prediction unit 60 determines that the most updated subsequent next fetch address was not selected, line predictor 12 is updated using the branch prediction, operations corresponding to the outdated subsequent next fetch address are canceled, and the updated subsequent next fetch address is fetched.

In the embodiment of FIG. 1, processor 10 employs a variable byte length, complex instruction set computing (CISC) instruction set architecture. For example, processor 10 may employ the x86 instruction set architecture (also referred to as IA-32). Other embodiments may employ other instruction set architectures including fixed length instruction set architectures and reduced instruction set computing (RISC) instruction set architectures. Certain features shown in FIG. 1 may be omitted in such architectures.

Line predictor 12 is configured to generate fetch addresses for I-cache 14 and is additionally configured to provide information regarding a line of instruction operations to alignment unit 16. Generally, line predictor 12 stores information regarding lines of instruction operations previously speculatively fetched by processor 10 and one or more next fetch addresses corresponding to each line to be selected upon fetch of the line. In one embodiment, line predictor 12 is configured to store 1K entries, each defining one line of instruction operations. Line predictor 12 may be banked into, e.g., four banks of 256 entries each to allow concurrent read and update without dual porting, if desired.

Line predictor 12 provides the next fetch address to I-cache 14 to fetch the corresponding instruction bytes. I-cache 14 is a high speed cache memory for storing instruction bytes. According to one embodiment I-cache 14 may comprise, for example, a 256 Kbyte, four way set associative organization employing 64 byte cache lines. However, any I-cache structure may be suitable. Additionally, the next fetch address is provided back to line predictor 12 as an input to fetch information regarding the corresponding line of instruction operations. The next fetch address may be overridden by an address provided by ITB 50 in response to exception conditions reported to PC silo and redirect unit 48.

The next fetch address provided by the line predictor may be the address sequential to the last instruction within the line (if the line terminates in a non-branch instruction). Alternatively, the next fetch address may be a target address of a branch instruction terminating the line. In yet another alternative, the line may be terminated by return instruction, in which case the next fetch address is drawn from return stack 22.

Responsive to a fetch address, line predictor 12 provides information regarding a line of instruction operations beginning at the fetch address to alignment unit 16. Alignment unit 16 receives instruction bytes corresponding to the fetch address from I-cache 14 and selects instruction bytes into a set of issue positions according to the provided instruction operation information. More particularly, line predictor 12 provides a shift amount for each instruction within the line instruction operations, and a mapping of the instructions to the set of instruction operations which comprise the line. An instruction may correspond to multiple instruction operations, and hence the shift amount corresponding to that instruction may be used to select instruction bytes into multiple issue positions. An issue position is provided for each possible instruction operation within the line. In one embodiment, a line of instruction operations may include up to 8 instruction operations corresponding to up to 6 instructions. Generally, as used herein, a line of instruction operations refers to a group of instruction operations concurrently issued to decode unit 24. The line of instruction operations progresses through the pipeline of microprocessor 10 to instruction queues 36 as a unit. Upon being stored in instruction queues 36, the individual instruction operations may be executed in any order.

The issue positions within decode unit 24 (and the subsequent pipeline stages up to instruction queues 36) defining the program order of the instruction operations within the line for the hardware within those pipeline stages. An instruction operation aligned to an issue position by alignment unit 16 remains in that issue position until it is stored within an instruction queue 36A–36B. Accordingly, a first issue position may be referred to as being prior to a second issue position if an instruction operation within the first issue position is prior to an instruction operation concurrently within the second issue position in program order. Similarly, a first issue position may be referred to as being subsequent to a second issue position if an instruction operation within the first issue position is subsequent to instruction operation concurrently within the second issue position in program order. Instruction operations within the issue positions may also be referred to as being prior to or subsequent to other instruction operations within the line.

As used herein, an instruction operation (or ROP) is an operation which an execution unit within execution cores 40A–40B is configured to execute as a single entity. Simple instructions may correspond to a single instruction operation, while more complex instructions may correspond to multiple instruction operations. Certain of the more complex instructions may be implemented within microcode unit 28 as microcode routines. Furthermore, embodiments employing non-CISC instruction sets may employ a single instruction operation for each instruction (i.e. instruction and instruction operation may be synonymous in such embodiments). In one particular embodiment, a line may comprise up to eight instruction operations corresponding to up to 6 instructions. Additionally, the particular embodiment may terminate a line at less than 6 instructions and/or 8 instruction operations if a branch instruction is detected. Additional restrictions regarding the instruction operations to the line may be employed as desired.

The next fetch address generated by line predictor 12 is routed to branch history table 18, indirect address cache 20, and return stack 22. Branch history table 18 provides a branch history for a conditional branch instruction which may terminate the line identified by the next fetch address. Line predictor 12 may use the prediction provided by branch history table 18 to determine if a conditional branch instruction terminating the line should be predicted taken or not taken. In one embodiment, line predictor 12 may store a branch prediction to be used to select taken or not taken, and branch history table 18 is used to provide a more accurate prediction which may cancel the line predictor prediction and cause a different next fetch address to be selected. Indirect address cache 20 is used to predict indirect branch target addresses which change frequently. Line predictor 12 may store, as a next fetch address, a previously generated indirect target address. Indirect address cache 20 may override the next fetch address provided by line predictor 12 if the corresponding line is terminated by an indirect branch instruction. Furthermore, the address subsequent to the last instruction within a line of instruction operations may be pushed on the return stack 22 if the line is terminated by a subroutine call instruction. Return stack 22 provides the address stored at its top to line predictor 12 as a potential next fetch address for lines terminated by a return instruction.

In addition to providing next fetch address and instruction operation information to the above mentioned blocks, line predictor 12 is configured to provide next fetch address and instruction operation information to PC silo and redirect unit 48. PC silo and redirect unit 48 stores the fetch address and line information and is responsible for redirecting instruction fetching upon exceptions as well as the orderly retirement of instructions. PC silo and redirect unit 48 may include a circular buffer for storing fetch address and instruction operation information corresponding to multiple lines of instruction operations which may be outstanding within processor 10. Upon retirement of a line of instructions, PC silo and redirect unit 48 may update branch history table 18 and indirect address cache 20 according to the execution of a conditional branch and an indirect branch, respectively. Upon processing an exception, PC silo and redirect unit 48 may purge entries from return stack 22 which are subsequent to the exception-causing instruction. Additionally, PC silo and redirect unit 48 routes an indication of the exception-causing instruction to map unit 30, instruction queues 36, and load/store unit 42 so that these units may cancel instructions which are subsequent to the exception-causing instruction and recover speculative state accordingly.

In one embodiment, PC silo and redirect unit 48 assigns a sequence number (R#) to each instruction operation to identify the order of instruction operations outstanding within processor 10. PC silo and redirect unit 48 may assign R#s to each possible instruction operation with a line. If a line includes fewer than the maximum number of instruction operations, some of the assigned R#s will not be used for that line. However, PC silo and redirect unit 48 may be configured to assign the next set of R#s to the next line of instruction operations, and hence the assigned but not used R#s remain unused until the corresponding line of instruction operations is retired. In this fashion, a portion of the R#s assigned to a given line may be used to identify the line within processor 10. In one embodiment, a maximum of 8 ROPs may be allocated to a line. Accordingly, the first ROP within each line may be assigned an R# which is a multiple of 8. Unused R#s are accordingly automatically skipped.

The preceding discussion has described line predictor 12 predicting next addresses and providing instruction operation information for lines of instruction operations. This operation occurs as long as each fetch address hits in line predictor 12. Upon detecting a miss in line predictor 12, alignment unit 16 routes the corresponding instruction bytes from I-cache 14 to predictor miss decode unit 26. Predictor miss decode unit 26 decodes the instructions beginning at the offset specified by the missing fetch address and generates a line of instruction operation information and a next fetch address. Predictor miss decode unit 26 enforces any limits on a line of instruction operations as processor 10 is designed for (e.g. maximum number of instruction operations, maximum number of instructions, terminate on branch instructions, etc.). Upon completing decode of a line, predictor miss decode unit 26 provides the information to line predictor 12 for storage. It is noted that predictor miss decode unit 26 may be configured to dispatch instructions as they are decoded. In FIG. 1, this option is illustrated with a dotted line. Alternatively, predictor miss decode unit 26 may decode the line of instruction information and provide it to line predictor 12 for storage. Subsequently, the missing fetch address may be reattempted in line predictor 12 and a hit may be detected. Furthermore, a hit in line predictor 12 may be detected and a miss in I-cache 14 may occur. The corresponding instruction bytes may be fetched through external interface unit 46 and stored in I-cache 14.

In one embodiment, line predictor 12 and I-cache 14 employ physical addressing. However, upon detecting an exception, PC silo and redirect unit 48 will be supplied a logical (or virtual) address. Accordingly, the redirect addresses are translated by ITB 50 for presentation to line predictor 12 (and in parallel to I-Cache 14 for reading the corresponding instruction bytes). Additionally, PC silo and redirect unit 48 maintains a virtual lookahead PC value for use in PC relative calculations such as relative branch target addresses. The virtual lookahead PC corresponding to each line is translated by ITB 50 to verify that the corresponding physical address matches the physical fetch address produced by line predictor 12. If a mismatch occurs, line predictor 12 is updated with the correct physical address and the correct instructions are fetched. PC silo and redirect unit 48 further handles exceptions related to fetching beyond protection boundaries, etc. PC silo and redirect unit 48 also maintains a retire PC value indicating the address of the most recently retired instructions. In the present embodiment, PC silo and redirect unit 48 may retire a line of instruction operations concurrently. Accordingly, PC silo and redirect unit 48 may transmit an R# indicative of the line to map unit 30, instruction queues 36A–36B, and load/store unit 42.

Decode unit 24 is configured to receive instruction operations from alignment unit 16 in a plurality of issue positions, as described above. Decode unit 24 decodes the instruction bytes aligned to each issue position in parallel (along with an indication of which instruction operation corresponding to the instruction bytes is to be generated in a particular issue position). Decode unit 24 identifies source and destination operands for each instruction operation and generates the instruction operation encoding used by execution cores 40A–40B. Decode unit 24 is also configured to fetch microcode routines from microcode unit 28 for instructions which are implemented in microcode.

According to one particular embodiment, the following instruction operations are supported by processor 10: integer, floating point add (including multimedia), floating point multiply (including multimedia), branch, load, store address generation, and store data. Each instruction operation may employ up to 2 source register operands and one destination register operand. According to one particular embodiment, a single destination register operand may be assigned to integer ROPs to store both the integer result and a condition code (or flags) update. The corresponding logical registers will both receive the corresponding PR# upon retirement of the integer operation. Certain instructions may generate two instruction operations of the same type to update two destination registers (e.g. POP, which updates the ESP and the specified destination register).

The decoded instruction operations and source and destination register numbers are provided to map unit 30. Map unit 30 is configured to perform register renaming by assigning physical register numbers (PR#s) to each destination register operand and source register operand of each instruction operation. The physical register numbers identify registers within register files 38A–38B. Additionally, map unit 30 assigns a queue number (IQ#) to each instruction operation, identifying the location within instruction queues 36A–36B assigned to store the instruction operation. Map unit 30 additionally provides an indication of the dependencies for each instruction operation by providing queue numbers of the instructions which update each physical register number assigned to a source operand of the instruction operation. Map unit 30 updates map silo 32 with the physical register numbers and instruction to numbers assigned to each instruction operation (as well as the corresponding logical register numbers). Furthermore, map silo 32 may be configured to store a lookahead state corresponding to the logical registers prior to the line of instructions and an R# identifying the line of instructions with respect to the PC silo. Similar to the PC silo described above, map silo 32 may comprise a circular buffer of entries. Each entry may be configured to store the information corresponding one line of instruction operations.

Map unit 30 and map silo 32 are further configured to receive a retire indication from PC silo 48. Upon retiring a line of instruction operations, map silo 32 conveys the destination physical register numbers assigned to the line and corresponding logical register numbers to architectural renames block 34 for storage. Architectural renames block 34 stores a physical register number corresponding to each logical register, representing the committed register state for each logical register. The physical register numbers displaced from architectural renames block 34 upon update of the corresponding logical register with a new physical register number are returned to the free list of physical register numbers for allocation to subsequent instructions. In one embodiment, prior to returning a physical register number to the free list, the physical register numbers are compared to the remaining physical register numbers within architectural renames block 34. If a physical register number is still represented within architectural renames block 34 after being displaced, the physical register number is not added to the free list. Such an embodiment may be employed in cases in which the same physical register number is used to store more than one result of an instruction. For example, an embodiment employing the x86 instruction set architecture may provide physical registers large enough to store floating point operands. In this manner, any physical register may be used to store any type of operand. However, integer operands and condition code operands do not fully utilize the space within a given physical register. In such an embodiment, processor 10 may assign a single physical register to store both integer result and a condition code result of an instruction. A subsequent retirement of an instruction which overwrites the condition code result corresponding to the physical register may not update the same integer register, and hence the physical register may not be free upon committing a new condition code result. Similarly, a subsequent retirement of an instruction which updates the integer register corresponding to the physical register may not update the condition code register, and hence the physical register may not be free upon committing the new integer result.

Still further, map unit 30 and map silo 32 are configured to receive exception indications from PC silo 48. Lines of instruction operations subsequent to the line including the exception-causing instruction operation are marked invalid within map silo 32. The physical register numbers corresponding to the subsequent lines of instruction operations are freed upon selection of the corresponding lines for retirement (and architectural renames block 34 is not updated with the invalidated destination registers). Additionally, the lookahead register state maintained by map unit 30 is restored to the lookahead register state corresponding to the exception-causing instruction.

The line of instruction operations, source physical register numbers, source queue numbers, and destination physical register numbers are stored into instruction queues 36A–36B according to the queue numbers assigned by map unit 30. According to one embodiment, instruction queues 36A–36B are symmetrical and can store any instructions. Furthermore, dependencies for a particular instruction operation may occur with respect to other instruction operations which are stored in either instruction queue. Map unit 30 may, for example, store a line of instruction operations into one of instruction queues 36A–36B and store a following line of instruction operations into the other one of instruction queues 36A–36B. An instruction operation remains in instruction queue 36A–36B at least until the instruction operation is scheduled for execution. In one embodiment, instruction operations remain in instruction queues 36A–36B until retired.

Instruction queues 36A–36B, upon scheduling a particular instruction operation for execution, determine at which clock cycle that particular instruction operation will update register files 38A–38B. Different execution units within execution cores 40A–40B may employ different numbers of pipeline stages (and hence different latencies). Furthermore, certain instructions may experience more latency within a pipeline than others. Accordingly, a countdown is generated which measures the latency for the particular instruction operation (in numbers of clock cycles). Instruction queues 36A–36B await the specified number of clock cycles (until the update will occur prior to or coincident with the dependent instruction operations reading the register file), and then indicate that instruction operations dependent upon that particular instruction operation may be scheduled. For example, in one particular embodiment dependent instruction operations may be scheduled two clock cycles prior to the instruction operation upon which they depend updating register files 38A–38B. Other embodiments may schedule dependent instruction operations at different numbers of clock cycles prior to or subsequent to the instruction operation upon which they depend completing and updating register files 38A–38B. Each instruction queue 36A–36B maintains the countdowns for instruction operations within that instruction queue, and internally allow dependent instruction operations to be scheduled upon expiration of the countdown. Additionally, the instruction queue provides indications to the other instruction queue upon expiration of the countdown. Subsequently, the other instruction queue may schedule dependent instruction operations. This delayed transmission of instruction operation completions to the other instruction queue allows register files 38A–38B to propagate results provided by one of execution cores 40A–40B to the other register file. Each of register files 38A–38B implements the set of physical registers employed by processor 10, and is updated by one of execution cores 40A–40B. The updates are then propagated to the other register file. It is noted that instruction queues 36A–36B may schedule an instruction once its dependencies have been satisfied (i.e. out of order with respect to its order within the queue).

Instruction operations scheduled from instruction queue 36A read source operands according to the source physical register numbers from register file 38A and are conveyed to execution core 40A for execution. Execution core 40A executes the instruction operation and updates the physical register assigned to the destination within register file 38A. Some instruction operations do not have destination registers, and execution core 40A does not update a destination physical register in this case. Additionally, execution core 40A reports the R# of the instruction operation and exception information regarding the instruction operation (if any) to PC silo and redirect unit 48. Instruction queue 36B, register file 38B, and execution core 40B may operate in a similar fashion.

In one embodiment, execution core 40A and execution core 40B are symmetrical. Each execution core 40 may include, for example, a floating point add unit, a floating point multiply unit, two integer units, a branch unit, a load address generation unit, a store address generation unit, and a store data unit. Other configurations of execution units are possible.

Among the instruction operations which do not have destination registers are store address generations, store data operations, and branch operations. The store address/store data operations provide results to load/store unit 42. Load/store unit 42 provides an interface to D-cache 44 for performing memory data operations. Execution cores 40A–40B execute load ROPs and store address ROPs to generate load and store addresses, respectively, based upon the address operands of the instructions. More particularly, load addresses and store addresses may be presented to D-cache 44 upon generation thereof by execution cores 40A–40B (directly via coupleions between execution cores 40A–40B and D-Cache 44). Load addresses which hit D-cache 44 result in data being routed from D-cache 44 to register files 38. On the other hand, store addresses which hit are allocated a store queue entry. Subsequently, the store data is provided by a store data instruction operation (which is used to route the store data from register files 38A–38B to load/store unit 42). Accordingly, a store may comprise a store address instruction operation and a store data instruction operation in this embodiment. In other words, the store address instruction operation and corresponding store data instruction operation are derived from the same instruction. The store may be an instruction, or may be an implicit portion of another instruction having a memory destination operand. Upon retirement of the store instruction, the data is stored into D-cache 44. Additionally, load/store unit 42 may include a load/store buffer for storing load/store addresses which miss D-cache 44 for subsequent cache fills (via external interface 46) and re-attempting the missing load/store operations. Load/store unit 42 is further configured to handle load/store memory dependencies.

Figure 2:
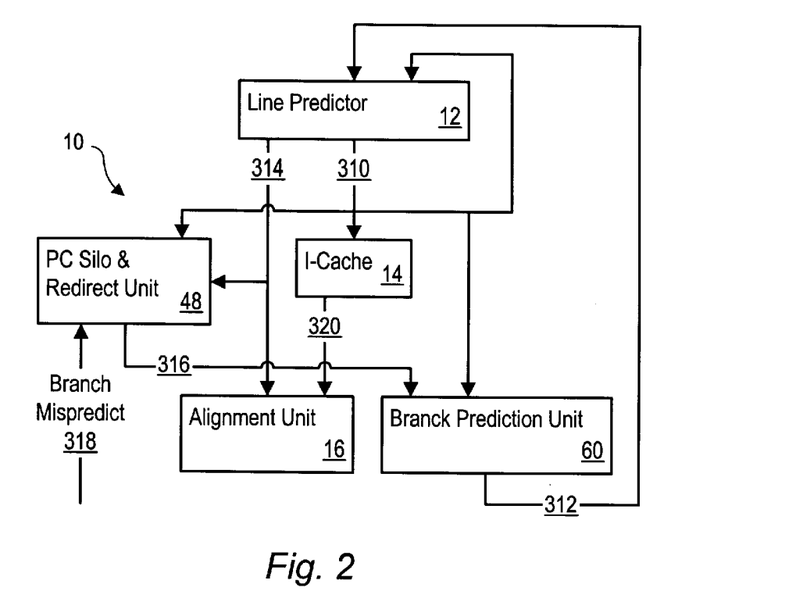
FIG. 2 is a block diagram of portions of one embodiment of the processor shown in FIG. 1, including a line predictor, an instruction cache, an alignment unit, a branch prediction unit, and a PC silo and redirect unit.

Turning now to FIG. 2, a block diagram of one embodiment of portions of processor 10 is shown. Other embodiments are possible and contemplated. In the embodiment of FIG. 2, a line predictor 12, an I-cache 14, an alignment unit 16, a PC silo and redirect unit 48, and a branch prediction unit 60 are shown. Line predictor 12 is coupled to I-cache 14, PC silo and redirect unit 48, and branch prediction unit 60 via bus 310. Line predictor is further coupled to alignment unit 16 and PC silo and redirect via bus 314. I-cache 14 is coupled to alignment unit 16 via bus 320. PC silo and redirect unit 48 is coupled to branch prediction unit 60 via bus 316. Branch prediction unit 60 is also coupled to line predictor 12 via bus 312. Lastly, bus 318 is coupled to PC silo and redirect to indicate a branch misprediction. In one embodiment not shown in FIG. 2, branch mispredictions are generated in either execution core 0 or execution core 1 and transmitted to PC silo and redirect via bus 318.

Line predictor 12 is configured to generate fetch addresses for I-cache 14 and is additionally configured to provide information regarding a line of instruction operations to alignment unit 16. Generally, line predictor 12 stores information regarding lines of instruction operations previously speculatively fetched by processor 10 and one or more next fetch addresses corresponding to each line to be selected upon fetch of the line. In one embodiment, line predictor 12 is configured to store 1K entries, each defining one line of instruction operations. Line predictor 12 may be banked into, e.g., four banks of 256 entries each to allow concurrent read and update without dual porting, if desired. Other banking schemes are possible and contemplated.

Line predictor 12 is configured to provide a next fetch address to I-cache 14 to fetch the corresponding instruction bytes and to branch prediction unit 60 to generate a branch prediction. Additionally, the next fetch address is provided back to line predictor 12 as an input to fetch information regarding the corresponding line of instruction operations. The next fetch address provided by the line predictor may be the address sequential to the last instruction within the line (if the line terminates in a non-branch instruction). Alternatively, the next fetch address may be a target address of a branch instruction terminating the line.

Responsive to a fetch address, line predictor 12 provides information regarding a line of instruction operations beginning at the fetch address to alignment unit 16. Alignment unit 16 receives instruction bytes corresponding to the fetch address from I-cache 14 and selects instruction bytes into a set of issue positions according to the provided instruction operation information. More particularly, line predictor 12 provides a shift amount for each instruction within the line instruction operations, and a mapping of the instructions to the set of instruction operations which comprise the line. An instruction may correspond to multiple instruction operations, and hence the shift amount corresponding to that instruction may be used to select instruction bytes into multiple issue positions. An issue position is provided for each possible instruction operation within the line. In one embodiment, a line of instruction operations may include up to 8 instruction operations corresponding to up to 6 instructions. The embodiment may terminate a line at less than 6 instructions and/or 8 instruction operations if a branch instruction is detected. Additional restrictions regarding the instruction operations to the line may be employed as desired.

In one embodiment of line predictor 12, a stored line of instruction line information in line predictor 12 may comprise information for up to eight instruction operations corresponding to up to 6 instructions in addition to a shift amount for the 6 instructions. The stored line of instruction line information may also include an indication of whether the line includes a branch instruction. Accordingly, the stored line r instruction line information corresponds to a line of instruction operations as may be routed to decode unit 24.

The next fetch address generated by line predictor 12 is routed to branch prediction unit 60 in addition to being routed back into line predictor 12. In one embodiment, branch prediction unit may comprise branch history table 18, indirect address cache 20, and/or return stack 22 (see FIG. 1 and FIG. 8). Other embodiments of branch prediction unit are possible and contemplated. If the line of instruction operations corresponding to the next fetch address terminates in a branch instruction, branch prediction unit 60 is configured to generate a branch prediction. Branch prediction unit 60 is configured to generate a branch prediction based upon the next fetch address as distinguished from the actual address corresponding to the branch instruction. Generally speaking, a next fetch address corresponds to the address of the first instruction in a particular line. If a branch instruction is the first instruction in a particular line, then the address corresponding to the branch instruction will be the same as the next fetch address corresponding to that line. If a branch instruction is not the first instruction in a particular line, however, then branch prediction unit 60 will use the next fetch address and not the address of the branch instruction to determine the branch prediction.

After generating a branch prediction, branch prediction unit 60 compares the branch prediction to a subsequent next fetch address generated by line predictor 12 using the next fetch address. If the branch prediction does not correspond to the subsequent next fetch address, then operations based upon the subsequent next fetch address are canceled and instructions based upon the branch prediction are fetched. In addition, line predictor 12 is updated using the branch prediction. Specifically, the branch prediction is used to update the subsequent next fetch address corresponding to the next fetch address. In one embodiment, a branch prediction comprises one or more bits that indicate whether a branch instruction is predicted taken or not taken. In an alternative embodiment, a branch prediction may be the address most recently used by the branch instruction. In another alternative embodiment, a branch prediction may be a pre-calculated or a historybased address generated by branch prediction unit 60.

In addition to providing next fetch address and instruction operation information as described above, line predictor 12 is configured to provide next fetch address and instruction operation information to PC silo and redirect unit 48. PC silo and redirect unit 48 stores the next fetch address and line information and is responsible for redirecting instruction fetching upon exceptions as well as the orderly retirement of instructions. PC silo and redirect unit 48 may include a circular buffer for storing next fetch address and instruction operation information corresponding to multiple lines of instruction operations which may be outstanding within processor 10. Upon retirement of a line of instructions, PC silo and redirect unit 48 may update branch prediction unit 60 according to the execution of a branch instruction.

Figure 3:
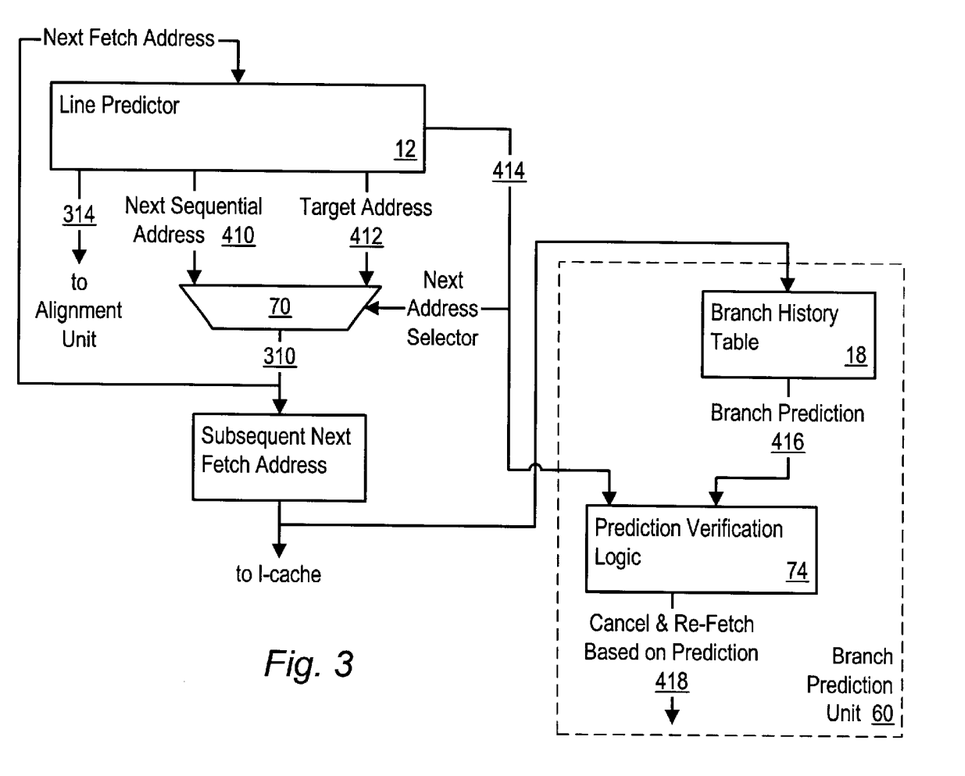
FIG. 3 is a block diagram of portions of one embodiment of the processor shown in FIG. 1, including a line predictor and a branch prediction unit.
Figure 8:
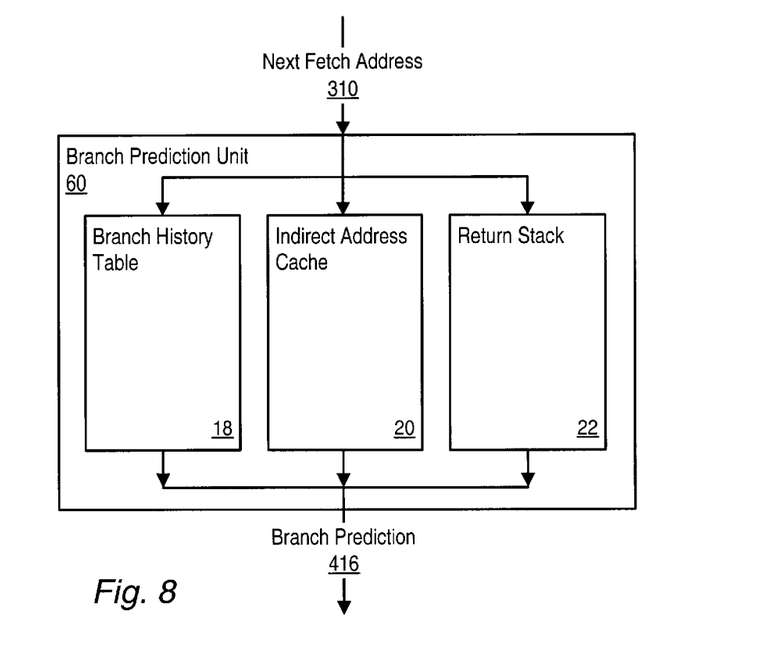
FIG. 8 is a block diagram illustrating one embodiment of a branch prediction unit.

Turning now to FIG. 3, a block diagram depicting one embodiment of a processor 10 is shown. Other embodiments are possible and contemplated. In the embodiment of FIG. 3, a line predictor 12, a multiplexer 70, and a branch prediction unit 60 are shown. Branch prediction unit 60 is shown comprising branch history table 18 and prediction verification logic 74. Branch prediction unit 60 may also include indirect address cache 20 and return stack 22 as shown in FIG. 8. Other embodiments of branch prediction unit 60 are possible and contemplated. Line predictor 12 is coupled to multiplexer 70 via buses 410, 412 and conductor 414 and to branch prediction unit 60 via conductor 414. Multiplexer 70 is coupled to branch prediction unit via bus 310 and back into line predictor 12 via bus 310. Multiplexer 70 is shown in FIG. 3 to be separate from line predictor 12 and branch prediction unit 60 for illustrative purposes. In other embodiments, multiplexer 70 may be located within line predictor 12 or branch prediction unit 60 or in other functional blocks. In addition, in certain embodiments multiplexer 70 may be omitted entirely or replaced by an equivalent logical structure.

In the embodiment shown in FIG. 3, line predictor 12 provides a next sequential address, a target address, and a next address selector to multiplexer 70. In response, multiplexer 70 generates a next fetch address by selecting either the next sequential address from bus 410 or the target address from bus 412 using the next address selector provided on conductor 414. In one embodiment, the next address selector comprises one or more bits stored in each line of instruction information in the line predictor. The value of the next address selector is set to select either the next sequential address or the target address.

Once generated, the next fetch address is provided to branch prediction unit 60 and is fed back into line predictor 12. If the line of instructions corresponding to the next fetch address, i.e. the line of instructions containing the instruction identified by the next fetch address, terminates in a branch instruction, then branch prediction unit 60 is configured to generate a branch prediction in response to receiving the next fetch address.

In the embodiment of FIG. 3, a branch prediction comprises one or more bits that indicate whether a branch instruction is taken or not taken. Branch predictions are stored in branch history table 18. In one particular embodiment of FIG. 3, a branch prediction comprises a two bit bi-modal counter. A bi-modal counter is configured to indicate one of two possible states based upon one or more of the prior states. For example, a bi-modal counter employed in FIG. 3 could be configured to predict a branch as taken only after determining that the branch was taken the two previous times the instruction was executed. Conversely, the bi-modal counter could be configured to predict a branch as not taken only after determining that branch was not taken the two previous times the instruction was executed. Other configurations of a bi-modal counter are apparent. In an alternative embodiment, a branch prediction may be the actual address most recently selected upon executing a branch instruction. In another alternative embodiment, a branch prediction may be a pre-calculated or history-based address generated by branch prediction unit 60.

As shown in FIG. 3, a branch prediction is provided to prediction verification logic 74 along with the next address selector. Prediction verification logic 74 is configured to compare the branch prediction and the next address selector. If the branch prediction and the next address selector match, then line predictor 12 has predicted the most recent next fetch address and instruction fetching and execution continue normally. If the branch prediction and the next address selector differ, then line predictor 12 has not predicted the most recent next fetch address and instruction fetching and execution corresponding to the mispredicted next fetch address are canceled. In addition, the most recent next fetch address is refetched and the mispredicted next fetch address is updated into line predictor 12.

After discovering a mispredicted next fetch address, the next address selector for a particular line of instruction information in line predictor 12 is updated using the branch prediction. Also, the most recent next fetch address is input into line predictor 12 to fetch the proper line of instruction information. In one embodiment, line predictor is banked and dual ported as discussed above with regard to FIG. 1 and FIG. 2 (see also FIG. 5 discussed below). If line predictor 12 is banked and dual ported, then the updated branch prediction can be written as the next address selector during the same clock cycle. With banking and dual porting, the minimum delay associated with a mispredicted fetch address would be one clock cycle. In another embodiment where line predictor 12 is not banked and/or dual ported, the steps of updating line predictor 12 and refetching using the most recent next fetch address are accomplished in successive clock cycles. This embodiment would produce at least a two cycle delay in processor 10 for each mispredicted next fetch address.

Figure 4:
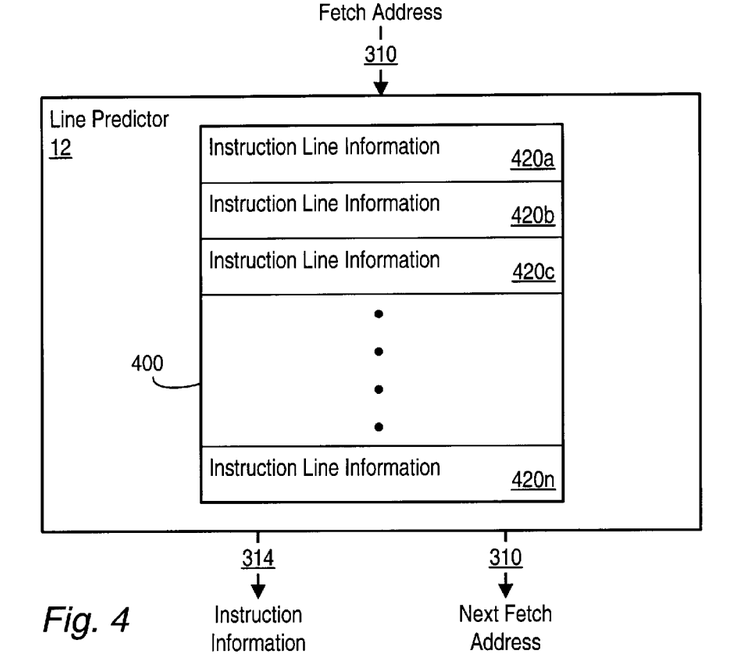
FIG. 4 is a block diagram illustrating one embodiment of a line predictor.

Turning now to FIG. 4, a block diagram of one embodiment of line predictor 12 is shown. Other embodiments are possible and contemplated. Line predictor 12 includes a storage device 400 configured to store a plurality of instruction information lines 420A–N. Storage device 400 could include any conventional storage structure including a content addressable memory array. In addition, storage device 400 could include any number of instruction information lines 420A–N. In one embodiment, storage device 400 is configured to store 1K instruction information lines. Line predictor 12 is configured to receive a next fetch address via bus 310 and to access the instruction information line associated with the next fetch address in storage device 400. Line predictor 12 is further configured to provide instruction information on bus 314 and a subsequent next fetch address on bus 310 associated with the next fetch address. As can be seen on FIG. 2, instruction information provided on bus 314 can be sent to the alignment unit 16 and PC silo and redirect unit 48. In addition, a subsequent next fetch address provided on bus 310 can be sent to I-cache 14, branch prediction unit 60, and PC silo and redirect unit 48 and can be input back into the line predictor 12 as a next fetch address.

Figure 5:
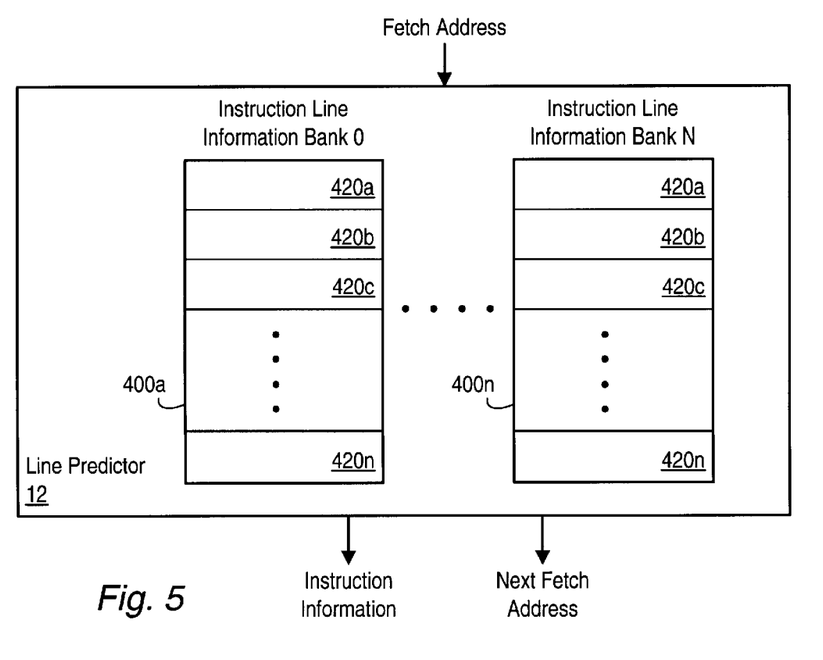
FIG. 5 is a block diagram illustrating an alternative embodiment of a line predictor.

Turning now to FIG. 5, a block diagram of another embodiment of line predictor 12 is shown. Other embodiments are possible and contemplated. Line predictor 12 includes a plurality of storage devices 400A–N (collectively referred to as storage devices 400) that are each configured to store a plurality of instruction information lines 420A–N. The storage devices 400 can also be referred to as instruction line information banks 0–N as shown. The storage devices 400 could include any conventional storage structures including content addressable memory arrays. In addition, each one of storage devices 400 could include any number of instruction information lines 420A–N. In one embodiment, line predictor 12 includes four storage devices 400 that are each configured to store 256 instruction information lines. Line predictor 12 is configured to receive a next fetch address via bus 310 and to access the instruction information line associated with the next fetch address in one of the storage devices 400. Line predictor 12 is farther configured to provide instruction information on bus 314 and a subsequent next fetch address on bus 310 associated with the next fetch address. As can be seen on FIG. 2, instruction information provided on bus 314 can be sent to the alignment unit 16 and PC silo and redirect unit 48. In addition, a subsequent next fetch address provided on bus 310 can be sent to I-cache 14, branch prediction unit 60, and PC silo and redirect unit 48 and can be input back into the line predictor 12 as a next fetch address.

Figure 6:
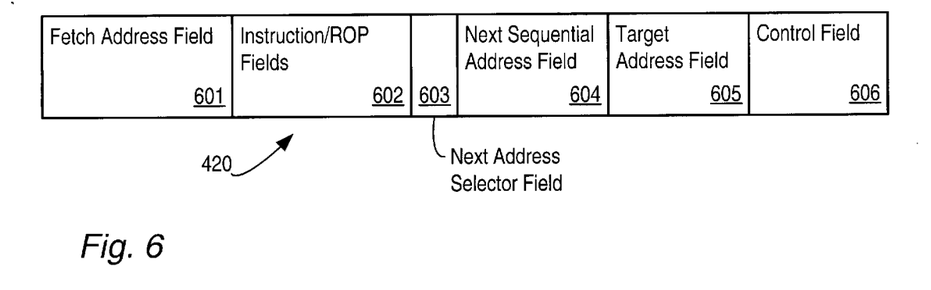
FIG. 6 is a diagram illustrating one embodiment of an instruction information line shown in FIG. 4.

Turning now to FIG. 6, a diagram of one embodiment of an instruction information line 420 shown in FIG. 4 is depicted. Other embodiments are possible and contemplated. Instruction line information 420 includes a fetch address field 601, a plurality of instruction/ROP fields 602, a next address selector field 603, a next sequential address field 604, a target address field 605, and a control field 606.

The plurality of instruction/ROP fields 602 is configured to store information for one or more instructions and ROPS. In one embodiment, the plurality of instruction/ROP fields include six instruction information fields and eight ROP information fields. These instruction information fields and ROP information fields are configured to store information for up to eight ROPs that corresponds to up to six instructions. The instruction information fields can be configured to store shift amounts for instructions and to provide a mapping of the instructions within a line of instructions. The ROP information fields may be used to select a particular ROP instruction. It is noted that the line predictor could be configured to store any combination of instruction and ROP information fields.

Fetch address field 601 is configured to store the fetch address associated with instruction information line 420. In one embodiment, the fetch address stored in fetch address field 601 corresponds to the instruction whose information is stored in the first of the plurality of instruction information fields. The next address selector field 603 is configured to store one or more bits indicating the next fetch address to be selected by line predictor 12. In one embodiment, the next fetch address selector is used to select the next fetch address from either a next sequential address stored the next sequential address field or a target address stored in the target address field and hence one bit is used. In the absence of a branch instruction associated with one of the instruction information fields, the next fetch address selector field is generally set to select the next sequential address. If one of the instruction information fields is associated with a branch instruction, then the next address selector field is generally set based upon whether the branch was taken or not taken in one or more of the recent executions of the instruction.

Next sequential address field 604 is configured to store the next sequential address corresponding to the instruction following the one or more instructions whose information is stored in instruction line information 420. In one embodiment, the next sequential address field stores the address subsequent to the address of the instruction whose information is stored in the last of the instruction information fields. The target address field 605 is configured to store the target address associated with a branch instruction whose information is stored in one of the instruction information fields. Control field 606 is configured to store bits indicating whether the instruction line information includes a branch instruction. If control field 606 indicates the presence of a branch instruction, line predictor 12 may be configured to select the target address from target address field 605 using next address selector 603.

Figure 7:
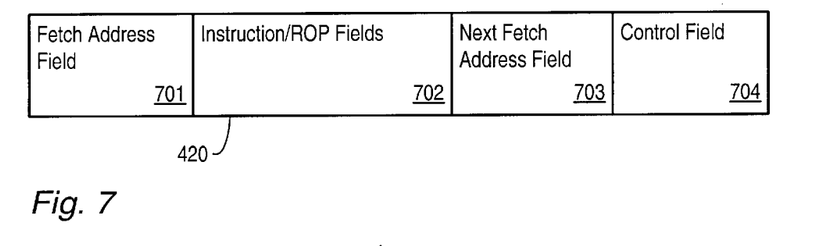
FIG. 7 is a diagram illustrating an alternative embodiment of an instruction information line shown in FIG. 4.

Turning now to FIG. 7, a diagram illustrating an alternative embodiment of an instruction information line shown in FIG. 4 is depicted. Other embodiments are possible and contemplated. Instruction line information 420 includes a fetch address field 701, a plurality of instruction/ROP fields 702, a next fetch address field 703, and a control field 704.

The plurality of instruction/ROP fields 702 is configured to store information for one or more instructions and ROPs. In one embodiment, the plurality if instruction/ROP fields include six instruction information fields and eight ROP information fields. These instruction information fields and ROP information fields are configured to store information for up to eight ROPs that corresponds to up to six instructions. The instruction information fields can be configured to store shift amounts for instructions and to provide a mapping of the instructions within a line of instructions. The ROP information fields may be used to select a particular ROP instruction. It is noted that the line predictor could be configured to store any combination of instruction and ROP information fields.

Fetch address field 701 is configured to store the fetch address associated with instruction information line 420. In one embodiment, the fetch address stored in fetch address field 701 corresponds to the instruction whose information is stored in the first of the plurality of instruction information fields. Next fetch address field 703 is configured to store a predicted next fetch address. The predicted next fetch address will generally correspond to the next sequential address for the last instruction whose information is contain in the last of the instruction information fields. If information corresponding to a branch instruction appears in one of the instruction information fields, however, the predicted next fetch address may correspond to a predicted target address of the branch instruction.

Control field 704 is configured to store bits indicating whether the instruction line information includes a branch instruction. If control field 704 indicates the presence of a branch instruction, line predictor 12 may be configured to store a predicted target address of the branch instruction in next fetch address field 703.

Turning now to FIG. 8, a block diagram of one embodiment of branch prediction unit 60 is shown. Other embodiments are possible and contemplated. As shown, this embodiment of branch prediction unit 60 comprises a branch history table 18, an indirect address cache 20, and a return stack 22. Branch prediction unit 60 is configured to receive a next fetch address on bus 310 and provide that address to branch history table 18, indirect address cache 20, and return stack 22. Branch prediction unit is also configured to convey a branch prediction on bus 416 from either branch history table 18, indirect address cache 20, or return stack 22.

Figure 9:
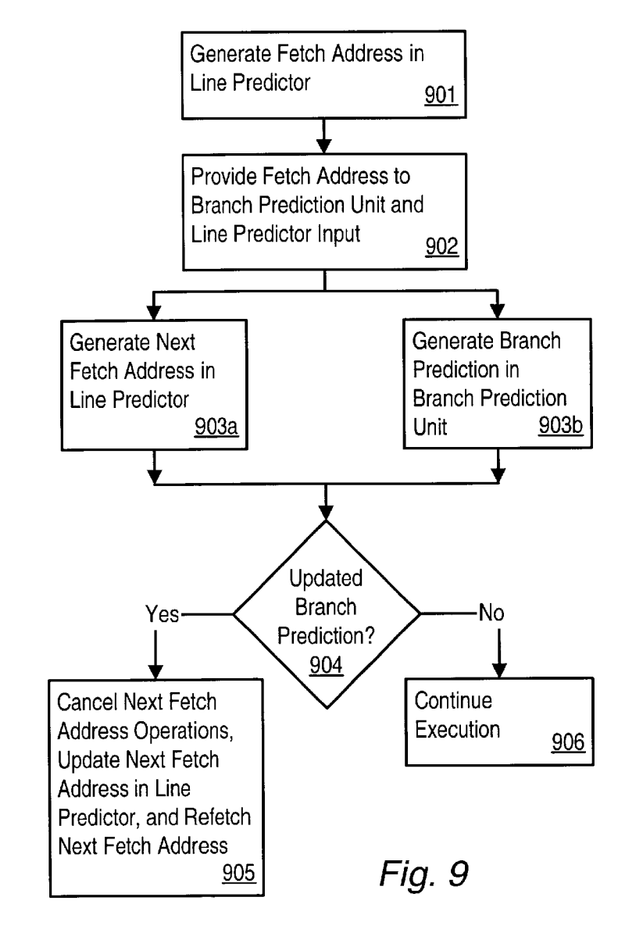
FIG. 9 is a flow chart illustrating the operation of one embodiment of a line predictor.

Turning now to FIG. 9, a flow chart illustrating the operation of one embodiment of a line predictor. Other embodiments are possible and contemplated. Block 901 depicts generating a fetch address in line predictor. Block 902 depicts providing the fetch address to branch prediction unit and line predictor input. Block 903A depicts generating a next fetch address in line predictor. Block 903B depicts generating a branch prediction in branch prediction unit. Decision block 904 depicts determining if the branch prediction and next fetch address differ. Block 905 depicts updating the next fetch address in line predictor and refetching the next fetch address if operation shown in decision block 904 is yes. Block 906 depicts continuing execution if the operation shown in decision block 904 is no.

In one embodiment, FIG. 9 illustrates the method of operation of line predictor 12 within processor 10. A fetch address is generated in line predictor 12 and provided to branch prediction unit 60 and line predictor 12 as shown in blocks 901 and 902. A next fetch address is generated in line predictor 12 based on the fetch address as shown in block 903A. In addition, a branch prediction is generated in branch prediction unit 60 as shown in block 903B. The branch prediction and the next fetch address are then compared as determined in block 904. If the branch prediction and next fetch address differ, then operations initiated by the next fetch address are canceled, the next fetch address is updated in line predictor 12, and the next fetch address is refetched as shown in block 905. If the branch prediction and next fetch address do not differ, execution continues normally.

Figure 10:
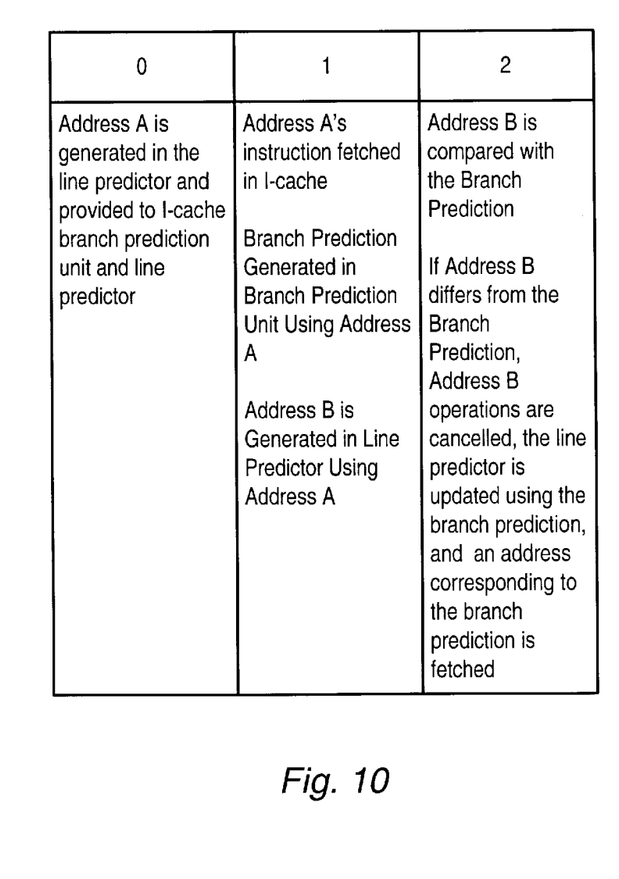
FIG. 10 is a timing diagram illustrating the timing of one embodiment of the microprocessor of FIG. 1.

Turning now to FIG. 10, a timing diagram illustrating the timing of one embodiment of the microprocessor of FIG. 1 is shown. Other embodiments are possible and contemplated. The diagram illustrates events that happen during particular clock cycles if a branch instruction is found in a fetched instruction line. Each column represents a clock cycle and is labeled with the clock cycle number at the top of each column.

In clock cycle 0, address A is generated in the line predictor and provided to I-cache, line predictor, and branch prediction unit. In clock cycle 1, address A's instructions are fetched in I-cache 14 and a branch prediction is generated in branch prediction unit 60 using address A. In addition, address B is generated in the line predictor using address A. In clock cycle 2, address B is compared with the branch prediction. If address B differs from the branch prediction, address B operations are canceled, line predictor is updated using the branch prediction, and an address corresponding to the branch prediction is fetched. In one embodiment, the events in clock cycles 0, 1, and 2 occur consecutively without any intervening clock cycles. In this embodiment, processor 10 is configured to encounter a one clock cycle delay if a branch instruction is mispredicted. In another embodiment, one or more clock cycles occur between clock cycles 0, 1, and 2. In a further embodiment, one or more of the events described occur in either the clock cycle precedent to or subsequent to the clock cycle in which it is depicted in FIG. 10.

Figure 11:
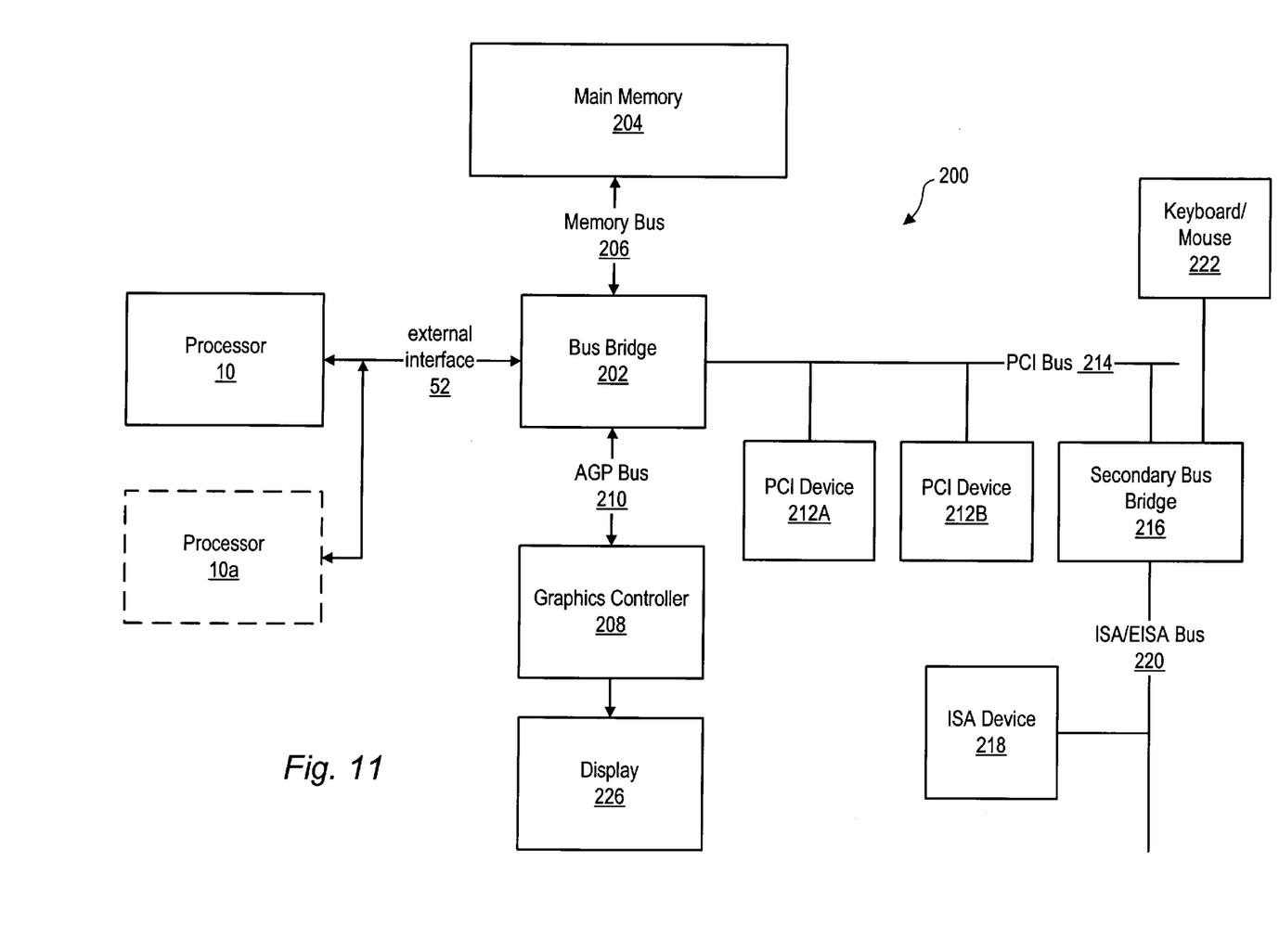
FIG. 11 is a block diagram of a computer system including the processor shown in FIG. 1.

Turning now to FIG. 11, a block diagram of one embodiment of a computer system 200 including processor 10 coupled to a variety of system components through a bus bridge 202 is shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Processor 10 is coupled to bus bridge 202 through external interface 52.

Bus bridge 202 provides an interface between processor 10, main memory 204, graphics controller 208, and devices attached to PCI bus 214. When an operation is received from one of the devices coupled to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to external interface 52 between processor 10 and bus bridge 202 in other embodiments. Alternatively, the external cache may be coupled to bus bridge 202 and cache control logic for the external cache may be integrated into bus bridge 202.

Main memory 204 is a memory in which application programs are stored and from which processor 10 primarily executes. A suitable main memory 204 comprises DRAM (Dynamic Random Access Memory). For example, main memory 204 may comprise a plurality of banks of SDRAM (Synchronous DRAM). Alternatively, main memory 204 may comprise RAMBUS DRAM (RDRAM) or any other suitable DRAM.

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional processors (e.g. processor 10a shown as an optional component of computer system 200). Processor 10a may be similar to processor 10. More particularly, processor 10a may be an identical copy of processor 10. Processor 10a may share external interface 52 with processor 10 (as shown in FIG. 9) or may be coupled to bus bridge 202 via an independent bus.

It is noted that various signals are described as being asserted and deasserted herein. A particular signal may be defined to be asserted when carrying a logical one value and deasserted when carrying a logical zero value. Alternatively, a particular signal may be defined to be asserted when carrying a logical zero value and deasserted when carrying a logical one value. It is a matter of design choice which definition is applied to a particular signal. Additionally, components that are said to be coupled together include any direct or indirect method that allows communication between the described components.

Numerous variations and modifications will become apparent to those skilled in the art once the above disclosure is fully appreciated. It is intended that the following claims be interpreted to embrace all such variations and modifications.

What is claimed is:

1. A microprocessor comprising:
    an instruction cache coupled to receive a first fetch address corresponding to two or more instructions terminated by a branch instruction, wherein the first fetch address locates an initial one of the two or more instructions in memory, and wherein the instruction cache is configured to store a plurality of instructions; and
    a branch prediction unit coupled to receive the first fetch address, the branch prediction unit comprising a storage storing branch prediction information corresponding only to branch instructions, wherein the storage is configured to output first branch prediction information in response to the first fetch address, and wherein the branch prediction unit is configured to generate a first branch prediction for the branch instruction terminating the two or more instructions located by the first fetch address responsive to the first branch prediction information, wherein the brancih prediction unit further comprises logic coupled to receive the first branch prediction and a second branch prediction corresponding to the first fetch address, and wherein the logic is configured to signal that the two or more instructions are to be cancelled if the first branch prediction disagrees with the second branch prediction.

2. The microprocessor as recited in claim 1 wherein the storage comprises a branch history table configured to store a plurality of branch predictions, and wherein the branch history table is configured to output the first branch prediction of the plurality of branch predictions in response to the first fetch address.

3. The microprocessor as recited in claim 1 wherein the branch instruction is located in memory by a second address different from the first fetch address received by the branch prediction unit.

4. The microprocessor as recited in claim 1 wherein the instruction cache and the branch prediction unit receive the first fetch address concurrently.

5. The microprocessor as recited in claim 1 wherein the logic is configured to cause a fetch of a second fetch address corresponding to the first branch prediction if the first branch prediction disagrees with the second branch prediction.

6. A method comprising:
    generating a first fetch address corresponding to two or more instructions terminated by a branch instruction, the first fetch address locating an initial one of the two or more instructions in memory;
    providing the first fetch address to a branch prediction unit, the branch prediction unit comprising a storage storing branch prediction information corresponding only to branch instructions;
    outputting first branch prediction information in response to the providing;
    generating a first branch prediction for the branch instruction in response to the first branch prediction information;
    generating a second branch prediction concurrent with generating the first fetch address;
    determining that the first branch prediction and the second branch prediction disagree; and
    cancelling the two or more instructions responsive to the determining.

7. The method as recited in claim 6 wherein the branch instruction is located in memory by a second address different from the first fetch address used in the generating the first branch prediction.

8. The method as recited in claim 6 further comprising fetching instructions from a second fetch address corresponding to the first branch prediction responsive to the determining.

9. A computer system comprising:
    a microprocessor including:
        an instruction cache coupled to receive a first fetch address corresponding to two or more instructions terminated by a branch instruction, wherein the first fetch address locates an initial one of the two or more instructions in memory, and wherein the instruction cache is configured to store a plurality of instructions; and
        a branch prediction unit coupled to receive the first fetch address, the branch prediction unit comprising a storage storing branch prediction information corresponding only to branch instructions, wherein the storage is configured to output first branch prediction information in response to the first fetch address, and wherein the branch prediction unit is configured to generate a first branch prediction for the branch instruction terminating the two or more instructions located by the first fetch address responsive to the first branch prediction information, wherein the branch prediction unit further comprises logic coupled to receive the first branch prediction and a second branch prediction corresponding to the first fetch address, and wherein the logic is configured to signal that the two or more instructions are to be cancelled if the first branch prediction disagrees with the second branch prediction; and
    a peripheral device for communicating between the computer system and another computer system.

10. The computer system as recited in claim 9 wherein the peripheral device comprises a modem.

11. The computer system as recited in claim 9 further comprising an audio peripheral device.

12. The computer system as recited in claim 11 wherein the audio peripheral device includes a sound card.

13. The computer system as recited in claim 9 further comprising a second processor including:
    a second instruction cache coupled to receive a second fetch address corresponding to two or more instructions terminated by a second branch instruction, wherein the second fetch address locates an initial one of the two or more instructions in memory, and wherein the second instruction cache is configured to store a plurality of instructions;
    a second branch prediction unit coupled to receive the second fetch address, the second branch prediction unit comprising a second storage storing second branch prediction information corresponding only to branch instructions, wherein the second storage is configured to output second branch prediction information in response to the second fetch address, and wherein the second branch prediction unit is configured to predict the second branch instruction terminating the two or more instructions located by the second fetch address responsive to the second branch prediction information.

14. The computer system as recited in claim 9 wherein the storage comprises a branch history table configured to store a plurality of branch predictions, and wherein the branch history table is configured to output the first branch prediction of the plurality of branch predictions in response to the first fetch address.

15. The computer system as recited in claim 9 wherein the branch instruction is located in memory by a second address different from the first fetch address received by the branch prediction unit.

16. The computer system as recited in claim 9 wherein the instruction cache and the branch prediction unit receive the first fetch address concurrently.

17. The computer system as recited in claim 9 wherein the logic is configured to cause a fetch of a second fetch address corresponding to the first branch prediction if the first branch prediction disagrees with the second branch prediction.

* * * * *